US009860057B2

(12) United States Patent
Smith et al.

(10) Patent No.: US 9,860,057 B2
(45) Date of Patent: Jan. 2, 2018

(54) DIFFIE-HELLMAN KEY AGREEMENT USING AN M-OF-N THRESHOLD SCHEME

(71) Applicant: Intel Corporation, Santa Clara, CA (US)

(72) Inventors: Ned M. Smith, Beaverton, OR (US); William C. Deleeuw, Beaverton, OR (US); Thomas G. Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 14/580,681

(22) Filed: Dec. 23, 2014

(65) Prior Publication Data

US 2016/0182228 A1   Jun. 23, 2016

(51) Int. Cl.
| | |
|---|---|
| *H04L 29/06* | (2006.01) |
| *H04L 9/08* | (2006.01) |
| *H04L 9/00* | (2006.01) |
| *H04L 9/32* | (2006.01) |

(52) U.S. Cl.
CPC ............ *H04L 9/0841* (2013.01); *H04L 9/002* (2013.01); *H04L 9/3215* (2013.01); *H04L 63/061* (2013.01); *H04L 63/1475* (2013.01); *H04L 63/0428* (2013.01)

(58) Field of Classification Search
CPC ..... H04L 9/002; H04L 9/0841; H04L 9/3215; H04L 63/061; H04L 63/1475
See application file for complete search history.

(56) References Cited

FOREIGN PATENT DOCUMENTS

DE    WO 2007144815 A2 * 12/2007  ........... G06T 7/0012

OTHER PUBLICATIONS

Deleeuw, et al., "Techniques and Architecture for Anonymizing User Data", PCT Patent Application No. PCT/US2013/077519, filed on Dec. 23, 2013, 48 pages.
Deleeuw, et al., "Techniques and Architecture for Anonymizing User Data", U.S. Appl. No. 14/369,268, filed Jun. 27, 2014, 48 pages.

(Continued)

*Primary Examiner* — Jeffrey Pwu
*Assistant Examiner* — Thong Truong
(74) *Attorney, Agent, or Firm* — Barnes & Thornburg LLP

(57) ABSTRACT

A data processing system (DPS) supports exchange of digital keys. The DPS comprises a communication module which, when executed by the DPS, is operable to receive, via multiple different network routes, multiple copies of a seed message from a second DPS, as part of a Diffie-Hellman key exchange process with the second DPS, wherein each copy of the seed message includes a seed value. The DPS also comprises a security module which, when executed by the DPS, is operable to perform operations comprising (a) determining a prevalent seed value, based on the multiple copies of the seed message; (b) computing a prevalence metric to indicate how many of the seed messages contained the prevalent seed value; and (c) determining whether a seed exchange portion of the Diffie-Hellman key exchange process has been successfully performed, based on the prevalence metric. Other embodiments are described and claimed.

25 Claims, 6 Drawing Sheets

(56) References Cited

OTHER PUBLICATIONS

Deleeuw, et al., "Improved Techniques for Context Information Management" PCT Patent Application No. PCT/US2013/077520, mailed on Dec. 23, 2013, 66 pages.
Deleeuw, et al., "Improved Techniques for Context Information Management", U.S. Appl. No. 14/369,275, filed Jun. 27, 2014, 66 pages.
Deleeuw, et al., "Temporal and Spatial Bounding of Personal Information" U.S. Appl. No. 14/294,345, filed Jun. 3, 2014, 64 pages.
Smith, et al., "Virally Distributable Trusted Messaging", U.S. Appl. No. 14/473,308, filed Aug. 29, 2014, 55 pages.
Deleeuw, et al., "Establishing Secure Digital Relationship Using Symbology", U.S. Appl. No. 14/494,802, filed Sep. 24, 2014, 32 pages.
Smith, et al., "Performing Pairing and Authentication Using Motion Information", U.S. Appl. No. 14/493,613, filed Sep. 23, 2014, 35 pages.
Smith, Ned, "Strong Authentication in the Cloud", Intel Corporation, Oct. 26, 2010, 22 pages.
Walker, et al., "Key Exchange with Anonymous Authentication using DAA-SIGMA Protocol," Intel Labs, Sep. 2010, 19 pages.
Intel Corporation, "Deeper Levels of Security with Intel® Identity Protection Technology", White Paper, Intel® Identity Protection Technology, 2012, 9 pages.
Wikipedia, "Diffie-Hellman Key Exchange" retrieved on Jan. 20, 2015, 11 pages. web page available at: <http://en.wikipedia.org/wiki/Diffie%E2%80%93Hellman_key_exchange>.
Brickell et al., "Enhanced Privacy ID (EPID)", Intel Corporation, Dec. 2011, 22 pages.
Heaton, Robert, "How does HTTPS actually work?", Mar. 27, 2014, 10 pages.
Bitan et al., "SIGMA: Sign-and-Mac Crypto Rationale and Proposals" IETF meeting, Dec. 2001, 25 pages.
Walker et al., "Key Exchange with Anonymous Authentication using DAA-SIGMA Protocol", Intel Labs, 2010, 19 pages.
Hoekstra, Matthew, "Intel SGX for Dummies;" Sep. 26, 2013, 4 pages.
Wikipedia, "SOCKS" retrieved on Oct. 30, 2014, 9 pages. web page available at: <http://en.wikipedia.org/wiki/SOCKS>.
Wikipedia, "Tor (anonymity_network)", retreived on Oct. 24, 2014, 12 pages. web page available at: <http://en.wikipedia.org/wiki/Tor_(anonymity_network)>.

* cited by examiner

DIFFIE-HELLMAN KEY AGREEMENT USING AN M-OF-N THRESHOLD SCHEME

TECHNICAL FIELD

Embodiments described herein relate generally to data processing and in particular to information security in data processing systems.

BACKGROUND

In the field of data processing, digital keys may be used to encrypt data, to protect the data from unauthorized access. For instance, in preparation for a communication session, two data processing systems (or "parties") may agree to use a particular digital key to encrypt (and decrypt) the messages to be shared during that communication session. Accordingly, that digital key may be referred to as a "session key." In addition, session keys are typically treated as shared secrets. For instance, the parties typically should not simply transmit the session keys, because an unauthorized party (or "opponent") might be monitoring the transmissions, and if the opponent gets the session key, the opponent will be able to decrypt and forge subsequent messages.

If two parties already have an established relationship, the two parties may be able to generate session keys for subsequent sessions without explicitly sharing those session keys. For instance, the parties may generate session keys based on previously agreed parameters.

In addition, processes have been developed to enable parties to generate session keys or other shared secrets by communicating various parameters with each other, even if the parties do not have a pre-established relationship. For instance, two parties without a pre-established relationship may use the process referred to as "Diffie-Hellman key exchange" to generate a shared secret. The Diffie-Hellman (DH) key exchange process is a key agreement algorithm or protocol that produces shared secrets between two parties.

However, the DH key exchange process is vulnerable to so-called "man in the middle" (MITM) attacks. The present disclosure describes methods and apparatus which provide for key exchange with reduced or eliminated vulnerability to MITM attacks.

DESCRIPTION OF EMBODIMENTS

Figure 1:
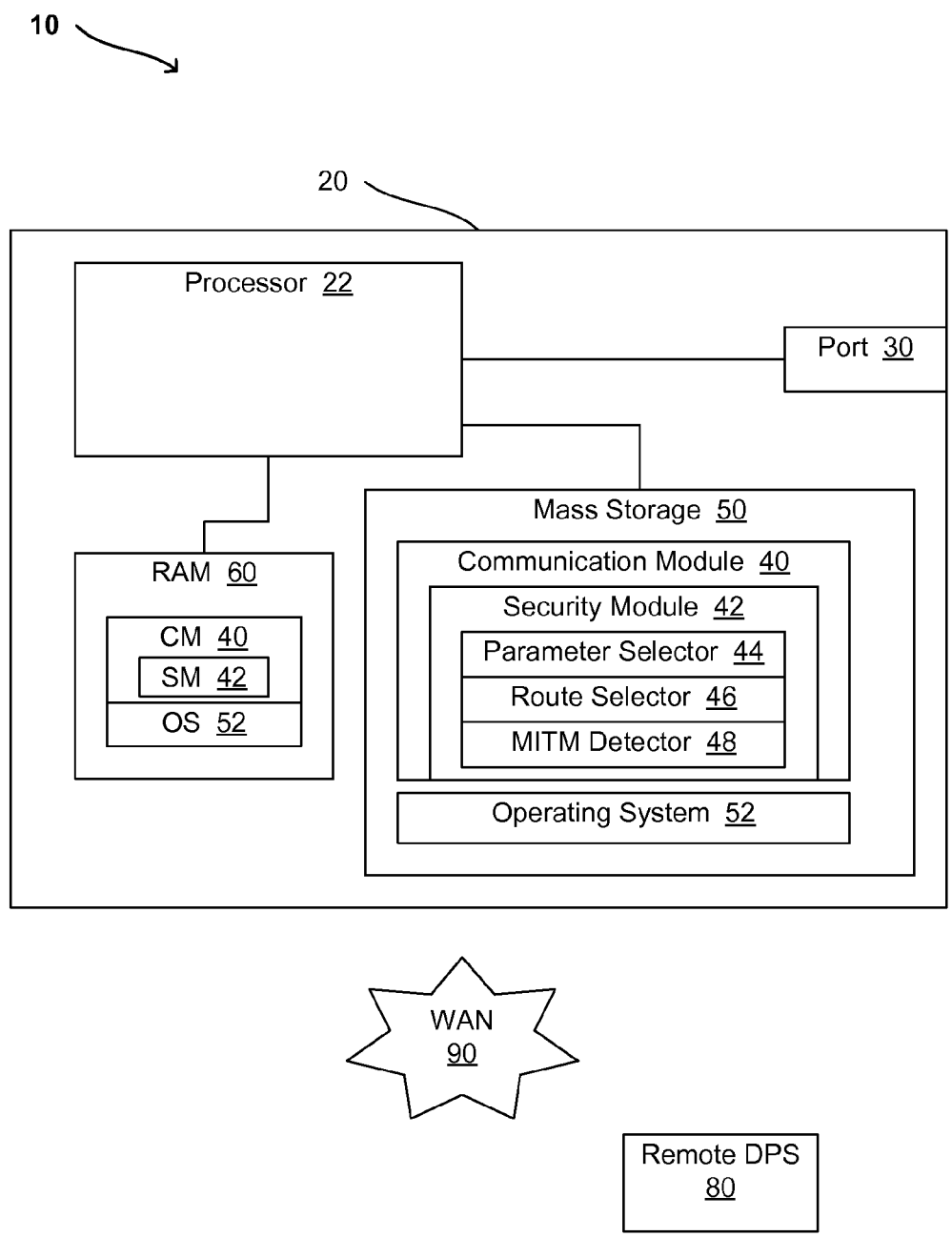
FIG. 1 is a block diagram of an example key exchange system.

For purposes of illustration, the present disclosure describes one or more example embodiments. However, the present teachings are not limited to those particular embodiments.

As explained at en.wikipedia.org/wiki/Diffie%E2%80%93Hellman_key_exchange, according to a typical DH key exchange protocol, two parties agree on a particular prime number (referred to as "p") and a particular base (referred to as "g"). Each party also selects a secret value (referred to as "a" and "b," respectively). Each party then uses its secret value, along with g and p, to compute a non-secret or public value (referred to as "A" and "B," respectively) that corresponds to the secret value. In particular, the first party computes $$A = g^a \bmod p,$$

and the second party computes $$B = g^b \bmod p.$$

For purposes of this disclosure, those non-secret values (e.g., A and B) may be referred to as "keys," "public keys," or "seeds." The parties then share the seeds with each other. Each party then use the seed received from the other party to generate a shared secret (referred to as "s"). In particular, the first party computes $$s = B^a \bmod p,$$

and the second party computes $$s = A^b \bmod p,$$

However, as indicated above, the conventional DH key exchange protocol is vulnerable to MITM attacks. For instance, an opponent might intercept the communications between the two parties and impersonate the two parties by generating imposter seeds and sharing those imposter seeds with the two parties, while saving the actual seeds sent by each party. The parties may be unable to detect the MITM, and the MITM may be able to access and decrypt all of the information shared by the parties.

By contrast, according to at least one embodiment in the present disclosure, two parties basically perform multiple DH key exchanges with the same seed values, via a certain number of different routes. Typically, a route consists of one or more intermediate nodes. Therefore, for purposes of this disclosure, unless the context requires otherwise, references to routes should also be understood as references to intermediate nodes, and vice versa. Also, for purposes of this disclosure, the number of different routes may be referred to as "N." Thus, each party may send N copies of its seed value to the other party via N different routes.

Additionally, successful completion of the protocol may require each receiving party to have received a certain number of identical seed values from the other party. The required number of identical seed values may be referred to as "M" or as the "success threshold." Accordingly, the key exchange protocol may be referred to as "DH key agreement using an M-of-N threshold scheme." According to this approach, if a MITM on one of the routes sends an imposter seed in place of an authentic seed, the imposter seed will have a different value than the authentic seed. Accordingly, the recipient may compare the seed values to determine which value was the most prevalent, and the recipient may conclude that the most prevalent value is the authentic value, as long as the most prevalent value meets a predetermined minimum acceptable level of prevalence. The predetermined minimum acceptable level of prevalence may also be referred to as a threshold of prevalence. For instance, the recipient may compute a prevalence metric by counting how many message were received with the most prevalent value. The recipient may then compare that prevalence metric with M to determine whether at least M copies of the same value have been received. The recipient may then determining whether the seed exchange portion of the DH key exchange process has been successfully performed, based on the prevalence metric and the predetermined threshold.

Thus, the parties may use N and M to define a maximum acceptable risk ratio or percentage. And parties may use different risk ratios in different embodiments or scenarios. For example, when very strict security is desired, the parties may use a large N, with M equal to N. For security that is less strict, the parties may use an M less than N, and/or the parties may use a smaller N. In at least one embodiment, M must be at least half of N. Some potential combinations of N and M include, without limitation, N=2 and M=2, N=3 and M=3, N=3 and M=2, N=4 and M=4, N=4 and M=3, N=4 and M=2, N=5 and M=5, N=5 and M=4, N=5 and M=3, N=6 and M=6, N=6 and M=5, N=6 and M=4, N=6 and M=3, etc. The prevalence metric and the threshold of prevalence may be implemented or expressed using any suitable approach, including without limitation as integer values, as ratios, as percentages, etc.

When the parties use an M-of-N threshold scheme, they may detect and defeat MITM attacks. For instance, if a MITM intercepts communications at one intermediate node but not the others, the parties may be able to detect any imposter seeds. For instance, with N=M=3, if the first party receives two seed values that match and one that doesn't, the first party may conclude that a MITM attack has occurred on the route used for the non-matching seed value.

FIG. 1 is a schematic diagram of an example key exchange system 10 that uses an M-of-N threshold scheme for DH key agreement. In the embodiment of FIG. 1, key exchange system 10 includes a local data processing system 20 and a remote data processing system (DPS) 80. Local DPS 20 and remote DPS 80 may communicate with each other via a wide area network (WAN) 90 (e.g., the Internet), a local area network (LAN), a personal area network (PAN), and/or any other suitable network or combination of networks.

Local DPS 20 includes at least one processor 22 in communication with various hardware components, such as a communications port 30, mass storage 50, and random access memory (RAM) 60. Mass storage 80 may be implemented using any suitable storage technology or combination of storage technologies, including without limitation a hard disk drive (HDD), a solid state drive (SSD), read-only memory (ROM), and/or other types of non-volatile or volatile storage technologies. Mass storage 80 includes various sets of instructions that may be loaded into RAM 60 and executed by processor 22. Those sets of instruction include an operating system (OS) 52 and a communication module 40. Communication module 40 includes a security module 42, and security module 42 includes a parameter selector 44, a route selector 46, and a MITM detector 48. In the embodiment of FIG. 1, communication module 40 runs as a user level application on top of OS 52. As indicated below, other types of communication modules may be used in other embodiments.

For purposes of illustration, this disclosure presents a hypothetical situation in involving a person named Alice and a bank named Bank Co. Alice has a checking account at Bank Co. Consequently, Alice and Bank Co. would like to securely share information with each other. To communicate with each other, Alice will use local DPS 20, and Bank Co. will use remote DPS 80. Remote DPS 80 may include components like those in local DPS 20 and/or any other suitable components. For purposes of this disclosure, local DPS 20 may also be referred to as the "first party," as the "source," or as an "endpoint." Similarly, remote DPS 80 may also be referred to as the "second party," as the "target," or as an "endpoint."

Figure 2A:
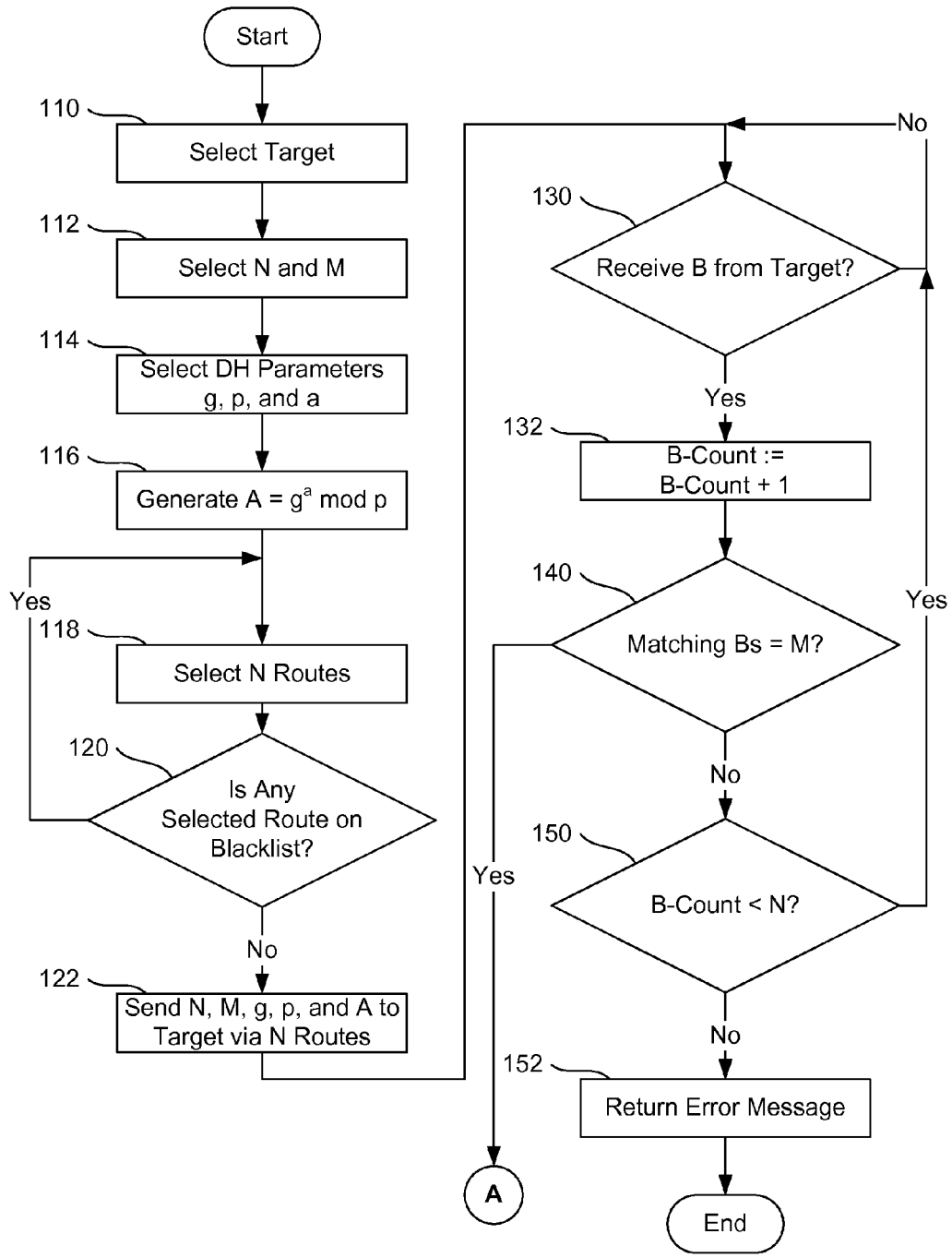
FIGS. 2A and 2B present a flowchart of an example process for exchanging keys according to the perspective of a first data processing system.
Figure 2B:
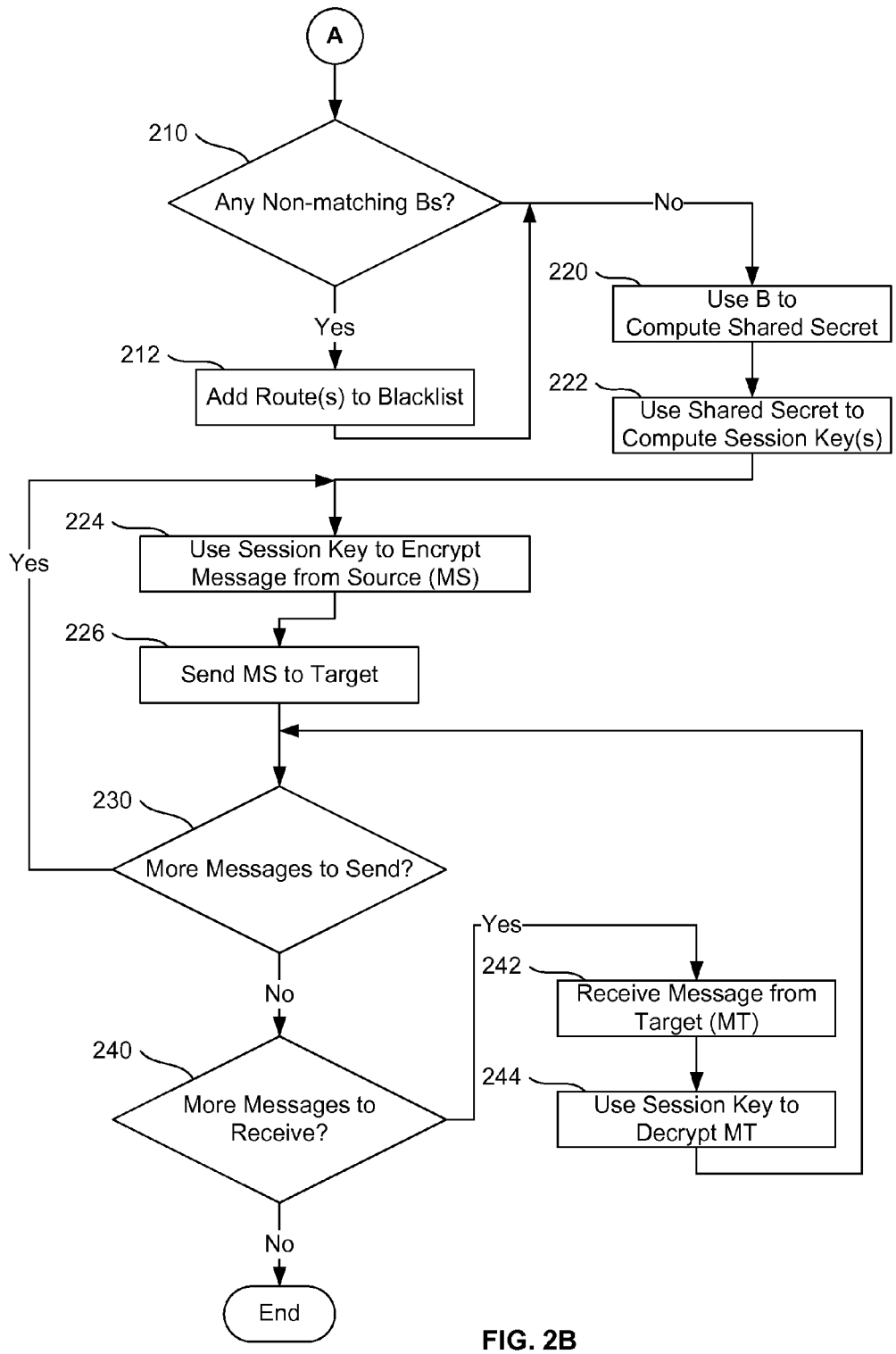

FIGS. 2A and 2B present a flowchart of an example process for exchanging keys according to the perspective of local DPS 20. For ease of understanding, that process involves an embodiment with operations that are relatively easy to follow, with a session key that may be used for multiple messages in a communication session. However, as described further below, other embodiments may use processes that involve different operations and additional or different kinds of keys for greater security. For instance, an embodiment may use more complex operations to create a new message key to encrypt each new message, rather than using the same session key to encrypt more than one message.

In the embodiment of FIG. 2A, communication module 40 is an email application, and Alice may be preparing to use communication module 40 to send instructions to Bank Co., where the instructions pertain to her checking account. For instance, Alice may have recently moved, and Alice may be preparing to send change-of-address information to Bank Co.

The process of FIG. 2A may start with Alice using communication module 40 to create a new email message. For instance, Alice may create a new message, with a body that contains the account number for her checking account, along with a request for Bank Co. to update Alice's postal mailing address. Alice may also specify an email address for Bank Co. (e.g., "CustomerService@BankCo.com") to be the recipient for that message. In other words, as shown at block 110, Alice may select Bank Co. as the target for the email message. Alice may also explicitly select or flag the email for secure communication.

Alternatively, security module 42 may determine that secure communications should be used for Alice's message, based on the selected target. In other words, security module 42 may automatically detect that Alice is requesting communication with target with which communications should be secure, based on the email address for Bank Co. as the intended target or recipient of the email message. After specifying the target, providing the desired message body, and possibly selecting an option for secure communication, Alice may then click a "send" button for that email message.

As shown at block 112, in response to detecting that communications with the target should be secure, parameter selector 44 of security module 42 may then set N and M values to be used for a DH key exchange process with Bank Co. Also, as shown at block 114, parameter selector 44 may select g, p, and a values for the DH process, where g is the base value, p is a prime number, and a is a secret value to be used as an exponent. As shown at block 116, security module 42 may then generate a first seed value "A"=$g^a$ mod p.

Local DPS 20 and remote DPS 80 (i.e., the endpoints) may use any suitable techniques to set the N-of-M values and DH parameter values (i.e., the key exchange parameter value). For instance, security module 42 in local DPS 20 and the corresponding security module in remote DPS may be set to use predetermined values for N, M, g, and p. Alternatively, the endpoints may negotiate some or all of the N, M, g, and p values. For instance, parameter selector 44 may automatically use predetermined N and M values for all targets. Alternatively, parameter selector 44 may use different N and M values for different categories of targets. For instance, parameter selector 44 may include policy definitions which provide for different levels of acceptable risk for different targets, to indicate when the risk of attack outweighs the cost of denial of service. For example, the policy definition for one category of targets may indicate that, if at least 75% of the received values are the same, and no more than 25% of the received values differ from the most prevalent value, the differing values should be treated as probable attack noise, and the most prevalent value should be accepted. For a different category of targets, the policy definitions may require all values to match. And for another category, the policy definitions may enable the endpoints to dynamically adjust the threshold parameters. For instance, the endpoints may start with a strict requirement (e.g., 100% matching), and then, if that requirement is not met, the policy definitions may call for the parameter selectors try a less strict requirement (e.g., 50% matching). Alternatively, if the strict requirement is not met, the parameter selectors may prompt the user to indicate whether a less strict requirement would be acceptable. For example, parameter selector 44 may prompt Alice to enter, approve, or modify the N and M values, if desired, and local DPS 20 may then send those values to remote DPS 80.

Alternatively, the source may prompt or allow the target to specify some or all of the key exchange parameter values, or the source may specify one or more values (e.g., the N value) while the target specifies the other values (e.g., the M value). Similarly, although this disclosure describes a scenario in which Alice is initiating communications with Bank Co., in other scenarios, Bank Co. may use the same or similar kinds of techniques to initiate communications with Alice.

In one embodiment, the source sends A, N, M, g, and p together in a single handshake message, along each of the N routes. Likewise, the target sends B, A, N, M, g, and p together in a single handshake message along N routes. Consequently, an attacker may need to change one of those values on all routes to avoid detection. Also, the endpoints may use a suitable delay, to ensure that all possible "real" handshake messages have been received, in order to verify that all received parameter values are valid (identical). If an endpoint subsequently receives one or more additional messages with one or more different parameter values, the endpoints may discard the shared secret, to avoid trusting a secret that has been attacked and is therefore less likely to be trustworthy.

In another embodiment, the source sends A to the target after the N, M, g, and p values have been negotiated. In other embodiments, any other suitable approaches may be used to arrive at common values for N, M, g, and p. For instance, a policy management service or a manageability console operating within one of the endpoints or within a trusted external device may provision values for M, N, g and p, possibly using techniques such as Security Assertion Markup Language (SAML) assertions, eXtensible Access Control Markup Language (XACML), Open Authorization (OAuth), OAuth version 2.0 (OAuth 2.0), Lightweight Directory Access Protocol (LDAP), Active Directory (AD), etc.

As shown at block 118, once N has been set, route selector 46 then selects N different routes for sending the first seed value to Bank Co. Route selector 46 may use any suitable technique to select the N different routes. For instance, route selector 46 may treat different email servers as different routes, and route selector 46 may use (a) a default email server for Alice and (b) the email address that Alice originally entered for Bank Co. as the first route. Route selector 46 may also prompt Alice to enter one or more (e.g., N−1) additional email address for Bank Co., to be used as the remaining routes. For instance, for N=3, Alice may know that Bank Co. uses the email servers identified by domain names "BankCo1.com" and "BankCo2.com" for key exchange verification, and Alice may enter "CustomerService@BankCo1.com" and "CustomerService@BankCo2.com" to select the second and third routes.

In addition or alternatively, route selector 46 may prompt Alice to select one or more (e.g., N) different email addresses or servers to be used as the sending email server. Alternatively, communication module 40 may keep a database of alternate routes or email addresses for Alice and for different targets such as Bank Co., and route selector 46 may automatically and randomly select from among the routes to Bank Co. in that database. Or route selector 46 may prompt Alice to select from among a random or substantially random subset of such routes. In other embodiments, as described in greater detail below, route selector 46 may use other techniques for selecting routes.

In addition or alternatively, route selector 46 may associate multiple email addresses on different email servers with Alice, and route selector may use one or more of those email address for one or more messages to one or more different email addresses on different servers for Bank Co. The source email address (e.g., "UserName@PersonalEmailServer.com") may thus identify both the first intermediate node of a route (e.g., "PersonalEmailServer.com") and the source (e.g., "UserName"), and the destination email address (e.g., "TargetName@CorporateEmailServer.com") may identify both the first intermediate node of a route (e.g., "CorporateEmailServer.com") and the target (e.g., "TargetName"). Accordingly, route selector 46 may select from among many different combinations of one or more first intermediate nodes and one or more last intermediate nodes. And the route selector on the target may do likewise.

Also, as shown at block 120, route selector 46 may determine whether any selected routes are on a blacklist. For instance, as described in greater detail below, MITM detector 48 may automatically maintain a blacklist of routes or intermediate nodes suspected of having made a MITM attack. If any routes are on the blacklist, the process may return to block 118, and route selector 46 may select a different route to be used in place of any blacklisted route.

Once none of the selected routes are on the blacklist, the process flows to block 122, with communication module 40 sending one copy of the N, M, g, p, and A values to the target via each of the selected routes. In other embodiments, only some of those values may be sent. For instance, as indicated above, security module 42 may send only A to remote DPS 80.

As described in greater detail below with regard to FIG. 3A, in response to receiving communications from the source, the target may generate a B value and then send N copies of that B value to the source, via N different routes. And as indicated above and below, the target may also include the A value from the source (and/or one or more of the other handshake parameters) in the message with the B value.

Referring again to FIG. 2A, as shown at block 130, after sending A to the target, communication module 40 may then wait to receive messages from the target with the B value. As shown at block 132, whenever communication module 40 receives a message from the target with a B value, MITM detector 48 increments a counter ("B-count") to keep track of how many B messages have been received. In addition, as shown at block 140, MITM detector 48 may determine whether M matching Bs have been received yet. For instance, if M=3, MITM detector may determine whether communication module 40 has received at least 3 messages with matching B values. If M matching B values have not yet been received, MITM detector 48 may determine if the total number of B messages is less than N. If so, the process may return to block 130, with communication module 40 waiting to receive another B message from the target. However, if the total B-count is equal to (or greater than) N (but M matching Bs have not been received), MITM detector 48 may conclude that the key exchange process has completed unsuccessfully, because the threshold number (M) of dependable B values was not received.

Similarly, when the B messages are also supposed to include other handshake parameters, MITM detector 48 may verify that all of the messages with the prevalent B value also included good echoes of the other handshake parameters (e.g., the right A, N, M, g, and p values). As shown at block 152, if local DPS 20 has not received M matching B values, with good echoes of the other handshake parameters if necessary, MITM detector 48 may return an error message to Alice, and the process may end. For instance, communication module 40 may notify Alice that the message could not be sent, due to a suspected MITM attack.

However, referring again to block 140, if M matching B values have been received, the process may pass through page connector A to block 210 of FIG. 2B. As shown at block 210, MITM detector 48 may determine whether any non-matching B values were received. If so, as shown at block 212, MITM detector 48 may add the routes for all non-matching Bs to a blacklist. For instance, if N=3, M=2, two matching Bs were received, and one non-matching B was received, MITM detector 48 may add an identifier for the route that was used by the non-matching B to the blacklist.

As shown at block 220, after receiving at least M matching B values, security module 42 may treat that value as the final, good B value, and use the B value to compute the shared secret. For instance, as indicated above, security module 42 may compute the shared secret "s" as follows:

$$s = B^a \bmod p.$$

As shown at block 222, security module 42 may then use the shared secret in a key derivation function (KDF) to compute a session key (SK). In other words, security module 42 may compute SK=KDF(s). As shown at block 224, security module 42 may then use the session key to encrypt the message (or the body of the message) that Alice originally requested to be sent to Bank Co. (by clicking the send button). Accordingly, if the original message is referred to as "M," the encrypted message may be referred to as "[M]$_{SK}$." As shown at block 226, communication module 40 may then send that encrypted message to Bank Co., using the email address specified by Alice (e.g., "CustomerService@BankCo.com").

Alternatively, as described in greater detail below, rather than using SK to encrypt the message, the source may generate different a single-use message key (SUMK) for each message, and the source may use that SUMK to encrypt the message.

Figure 3A:
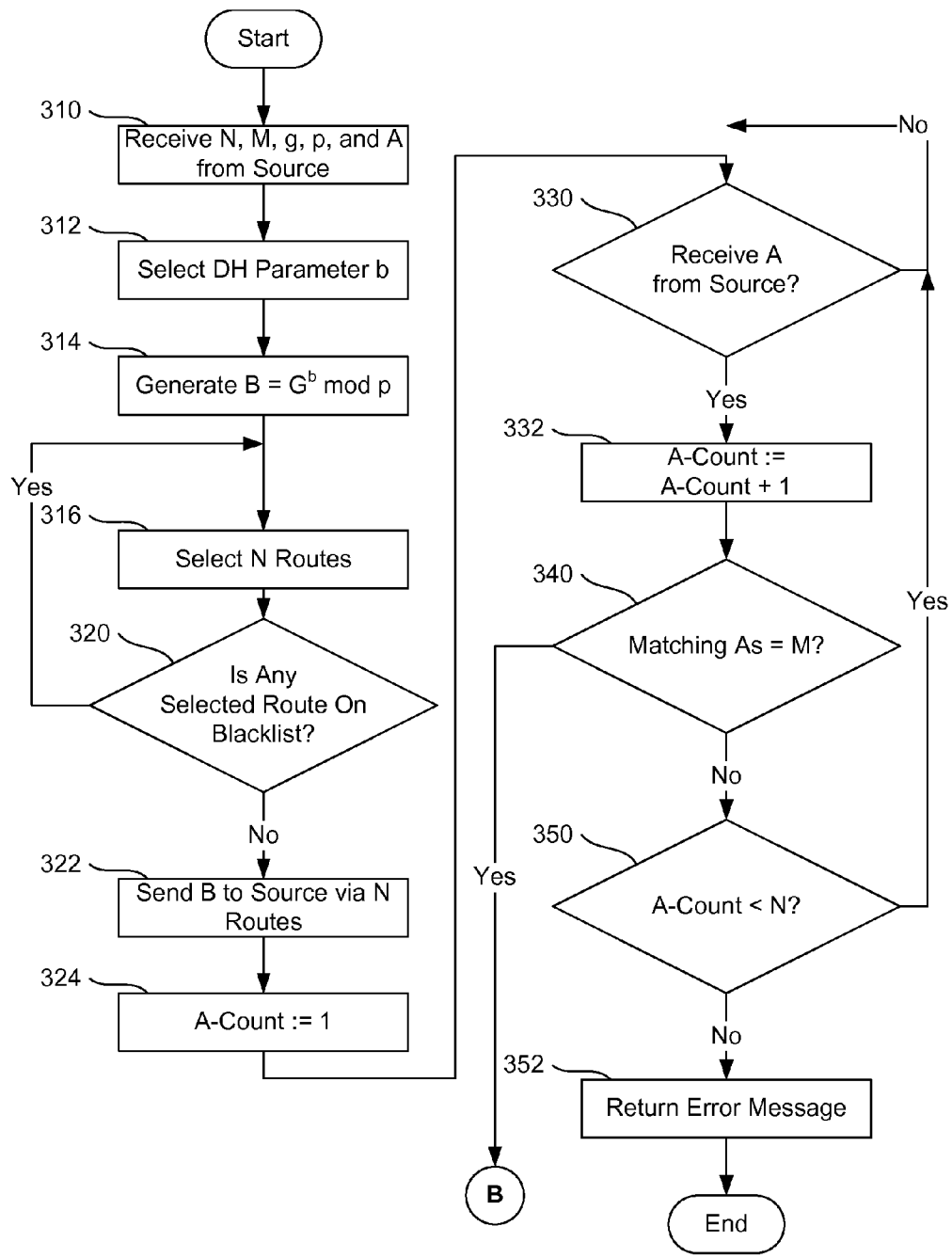
FIGS. 3A and 3B present a flowchart of an example process for exchanging keys according to the perspective of a second data processing system.
Figure 3B:
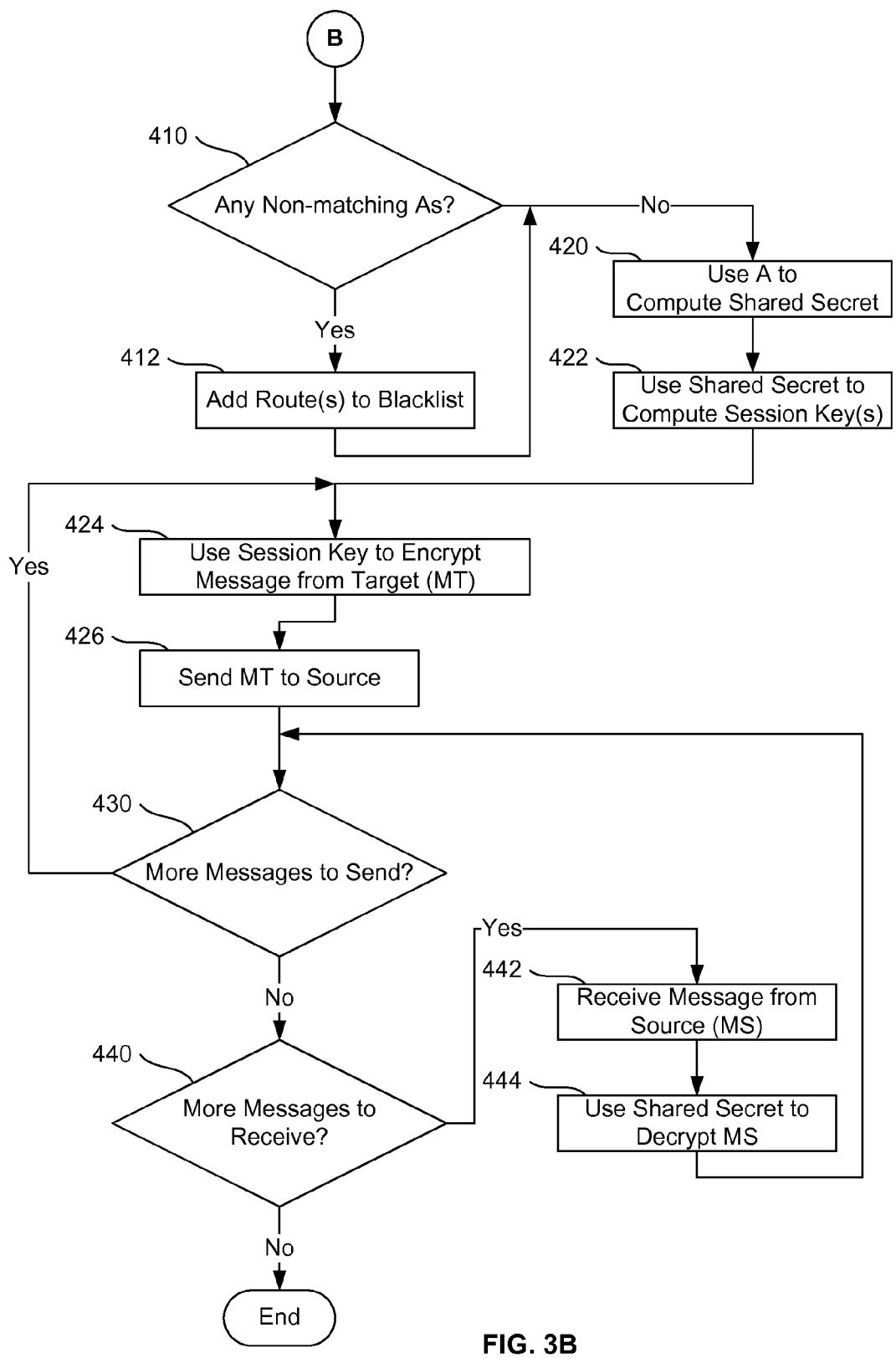

Referring again to the embodiment of FIG. 3B, as shown at block 230, communication module 40 may then determine whether there are any more messages to be sent from Alice to Bank Co. If there are, the process may return to block 224, with security module 42 using the session key to encrypt those messages, and with communication module 40 then sending those encrypted messages, as shown at block 226.

If there are no more message to send from Alice to Bank Co., communication module 40 may determine if there are any messages to receive from Bank Co., as shown at block 240. If communication module 40 detects an incoming message from Bank Co., security module 42 may receive the message and then use the session key to decrypt the message, as shown at blocks 242 and 244.

When there are no more messages to send or receive, communication module 40 may conclude that the communication session has finished, and the process of FIG. 2B may end.

FIGS. 3A and 3B present a flowchart of an example process for exchanging keys according to the perspective of remote DPS 80. The process of FIG. 3A may begin with a communication module in remote DPS 80 receiving a message from local DPS 20 to initiate the cooperative portion of the key exchange process. For instance, that message may contain the seed value (A) that was generated by local DPS 20, possibly along with other DH and N-of-M parameters, such as N, M, g, and p. Alternatively, as indicated above, local DPS 20 and remote DPS 80 may negotiate some or all of the parameters DH and N-of-M parameters first, before local DPS 20 sends A to remote DPS 80, or any other approach may be used to share parameters.

As shown at block 312, in response to receiving the message from local DPS that initiated the cooperative portion of the key exchange process, the communication module in remote DPS 80 may use a parameter selector to select a b value for the DH process, where b is a secret value to be used as an exponent. As shown at block 314, a security module in remote DPS 80 may then compute a second seed value "B"=$g^b$ mod p.

As shown at block 316, a route selector in remote DPS 80 may then select N different routes for sending B to local DPS 20. For instance, remote DPS 80 may maintain a collection of email addresses for Alice, with each email address naming a different email server (e.g., Alice@yahoo.com, Alice@gmail.com, etc.), and the route selector may select N different email addresses for sending B to Alice, including the email address from which Alice sent B to remote DPS 80. In addition, as shown at block 320, the route selector may determine whether any of those routes (e.g., any of the selected email servers) are on a blacklist. For any blacklisted routes, the process may return to block 316 with the route selector selecting a new route to replace the blacklisted route. Once the route selector has selected N non-blacklisted routes, the communication module sends a copy of the B value to the source via each of the selected routes. For example, the communication module may send B to Alice via N email messages, with each message addressed to a different one of the selected email addresses for Alice.

As described above with regard to FIGS. 2A and 2B, in response to receiving messages from the target with the B value, the source may determine whether a sufficient threshold number of B values match. And if a sufficient number match, the source may use the most prevalent B value to compute a shared secret.

Referring again to FIG. 3A, as shown at block 324, a MITM detector in remote DPS 80 may also initialize a counter ("A-count") to 1, to keep track of how many A messages have been received. As shown at block 330, the communication module in remote DPS 80 may then wait to receive additional messages from the source with the A value. As shown at block 332, whenever the communication module receives a message from the source with an A value, the MITM detector increments A-count. In addition, as shown at block 440, the MITM detector may determine whether M matching As have been received yet. If M matching A values have not yet been received, the MITM detector may determine if the total number of A messages is less than N. If so, the process may return to block 330, with the communication module waiting to receive another A message from the source. However, if the total A-count is equal to (or greater than) N (but M matching As have not been received), the MITM detector may conclude that the key exchange process has completed unsuccessfully, because the threshold number (M) of dependable A values was not received.

Similarly, when the A messages are also supposed to include other handshake parameters, the MITM detector may verify that all of the messages with the prevalent A value also included matching values for each of those handshake parameters (e.g., the right N, M, g, and p values). As shown at block 352, if remote DPS 80 has not received M matching A values, with matching values for the other handshake parameters if necessary, the MITM detector may return an error message to Bank Co., and the process may end. For instance, the communication module may notify Bank Co. that Alice attempted to send secure email to Bank Co. but the attempt failed due to a suspected MITM attack.

However, referring again to block 340, if M matching A values have been received, the process may pass through page connector B to block 410 of FIG. 3B. As shown at block 410, the MITM detector may determine whether any non-matching A values were received. If so, the MITM detector may add the routes for all non-matching As to a blacklist, as shown at block 412.

As shown at block 420, after receiving at least M matching A values, the security module may treat that value as the final, good A value, and use the A value to compute the shared secret. For instance, as indicated above, the security module may compute the shared secret "s" as follows:

$$s = A^b \bmod p.$$

As shown at block 422, the security module may then use the shared secret to compute a session key that matches the session key that will be generated by the source upon reception of B. In other words, the security module may compute SK=KDF(s), using the same KDF that will be used by local DPS 20.

As shown at block 424, the security module may then use the session key to encrypt a message (or the body of a message) to be sent to Alice. For instance, the body of that message may acknowledge receipt of Alice's message to Bank Co. As shown at block 426, the communication module of remote DPS 80 may then send the encrypted version of that message to Alice.

As shown at block 430, the communication module may then determine whether there are any more messages to be sent from Bank Co. to Alice. If there are, the process may return to block 424, with the security module using the session key to encrypt those messages, and with the communication module then sending those encrypted messages, as shown at block 426.

If there are no more message to send from Bank Co. to Alice, the communication module may determine if there are any further messages to receive from Alice, as shown at block 440. If the communication module detects an incoming message from Alice, the security module may receive that message and then use the session key to decrypt the message, as shown at blocks 442 and 444.

When there are no more messages to send or receive, the communication module may conclude that the communication session has finished, and the process of FIG. 4B may end.

After the endpoints have created the shared secret, they may also use that shared secret to secure future communication sessions. For instance, each endpoint may use the shared secret as a seed for an entropy multiplexing (MP) system that produces new values of A and B for subsequent sessions (e.g., for each day of the week). Each endpoint may the use those new A and B values to create a new shared secret, without either endpoint sending any new A or B value to the other endpoint. Thus, the endpoints need not connect electronically to agree on the new A and B values.

FIGS. 2A, 2B, 3A, and 3B depict a process in which the endpoints share A and B values in the clear, and the endpoints may use the same session key to encrypt more than one message. As indicated above, in other embodiments, the endpoints may perform additional steps to provide for increased security and reliability. For instance, after the source generates the shared secret, based on a trustworthy or good B value from the target, the source may perform operations such as the following:

1. Use the shared secret (s) and a KDF to generate a shared secret key (SSK). (The target may also use the same KDF (and the same shared secret) to generate the same SSK.) In one embodiment, the KDF is a predetermined hash function to hash the shared secret to a smaller value.
2. Generate a first single-use message key (SUMK1). For example, SUMK1 may be a random number of a selected length.
3. Use SUMK1 to encrypt the body (B1) of the first message, thereby generating an encrypted body (B1-E).
4. Use SSK to encrypt SUMK1, thereby generating an encrypted SUMK1 (SUMK1-E).
5. Build the first message (M1), to include B1-E and SUMK1-E.
6. Send M1 to the target.
7. If the source has another message to send to the source, return to step 2 to generate a second single-use message key (SUMK2), and use the new SUMK2 in place of SUMK1 when repeating steps 2 through 6.
8. Repeat steps 2 through 6 for each subsequent message, using new SUMKs for each message.

Another way to express steps 1 through 5 above is as follows:
1. SSK=KDF(s).
2. SUMK1=RandomNumber( ).
3. B1-E=[B1]$_{SUMK1}$.
4. SUMK1-E=[SUMK1]$_{SSK}$.
5. M1=B1-E‖SUMK1-E.

Similarly, upon receipt of a message (e.g., M1=B1-E‖SUMK1-E), the recipient may perform operations such as the following:
1. SSK=KDF(s).
2. SUMK1=Decrypt(SUMK1-E, SSK).
3. B1=Decrypt(B-E, SUMK1).

In addition, the endpoints may use authentication data to attest to the authenticity of some or all of the messages communicated between the endpoints. For instance, the authentication data may include (a) integrity data such as a message authentication code (MAC) to attest to integrity of the message and/or (b) identity data to attest to the identity or other attributes of the data processing system sending the message.

For example, the identity data may be a digital signature. For instance, the sender may use a private key to sign the message, and the recipient may use a corresponding public key to verify the signature. The private key may serve to identify certain attributes of the sender. Alternatively, the sender may use the shared secret to attest to its identity. For example, after the target has received a good A and generated the shared secret, the target may use the shared secret to encrypt one or more of the handshake parameters (e.g., N, M, and B) to prove to the source that the target has/knows the proper values for M and N. In addition or alternatively, the target may generate a SUMK, encrypt that SUMK with the shared secret, and send the encrypted SUMK to the source along with B.

In addition or alternatively, the sender may use a private key to prove that the sender has a certain type of trusted execution environment (TEE), including hardware and/or software from a particular trusted vendor, with a particular trusted configuration, and/or with other trusted attributes. In addition or alternatively, endpoints may use techniques such as cipher block chaining message authentication code (CBC-MAC), Counter with CBC-MAC (CCM), Authenticated Encryption with Associated Data (AEAD) algorithms such as EAX (which is not an acronym), Galois/Counter Mode (GCM), etc., to provide for authenticated encryption.

Furthermore, different data processing systems with common attributes (e.g., different data processing systems from the same producer) may use different private keys from a single source (e.g., from the original equipment manufacturer or OEM), but all of those private keys may have a single corresponding public key that can be used to verify any of the private keys. Accordingly, the public key may be referred to as "a group public key," and the private key may be referred to as an "enhanced private key." The sender may use an enhanced private key to sign the message, and the recipient may use the corresponding group public key to verify the signature. The signature may be Enhanced Privacy Identifier (EPID) signature, for instance.

In one embodiment, after the source determines that it has received a good B from the target, the source generates an authentication message and sends N copies of the authentication message to the target. The authentication message may include attestation information attesting to the trustworthiness of the message. For example, the attestation information may include identity data (ID) for the platform that attests to the trustworthiness of the source. The identity data for the platform may include a hash of the firmware and some or all of the other software used to implement a TEE on the source, for example. Such a hash may be referred to as an environment hash. The attestation information may also include a message authentication code (MAC) to verify integrity of the authentication message. In addition or alternatively, the attestation information may include the A and B values. For example, the source may generate the authentication message (AM)=A∥B∥ID∥MAC.

In addition, the source may use a signature protocol like EPID to digitally sign the authentication message—e.g., EPIDSIG=Sign$_{EPID}$(AM). The source may also encrypt the authentication message with the SK (or with a SUMK)—e.g., encrypted AM (AM-E)=[AM∥EPIDSIG]$_{SK}$.

The target may then determine whether it has received at least M matching copies of the authentication message, and the target may determine whether that content of the authentication message is valid (e.g., whether the EPID signature is good, whether the A and B values are correct, etc.) If those determinations are positive, the target may conclude that a signed DH handshake has been completed successfully, and the target may then use the session key (and/or one or more other keys) to securely communicate with the source.

In one embodiment, the source uses the Internet Protocol Security (IPSec) and Internet Key Exchange (IKE) SIGN-and-MAC (SIGMA) key exchange protocol to generate the authentication message.

In one embodiment, the attestation information in the authentication message uses the environment hash to prove that the policy in the source for performing key exchange operations is legitimate. If the target determines that the environment hash does not correspond to a known good policy, the target may conclude that the policy used by the source is illegitimate or not trustworthy. Consequently, if malware compromises an intermediate routing node and attempts to implement a man-in-the-middle attack, that attacker/opponent must produce an attestation value that satisfies the receiver's policy for legitimate endpoint environment.

In one embodiment, the source uses platform security technologies like those described by Intel Corporation under the name or trademark Software Guard Extensions (SGX) to provide a TEE, and the source uses those platform security technologies to provide the environment hash. In addition, the source uses an EPID key which attests to the trustworthiness of the TEE. The target may therefore trust that the authentication message is coming from a legitimate or trustworthy endpoint. By contrast, a MITM attach may come from a platform without a trustworthy execution environment. Consequently, the attacker/opponent may be unable to provide an acceptable environment hash with a signature from an acceptable EPID key.

In one embodiment, local DPS 20 and remote DPS 80 automatically generate and process the A messages, the B messages, and such behind the scenes in a manner that is transparent to the user. For instance, when communication module 40 receives B messages from the target, communication module 40 may refrain from adding those messages to Alice's in box. Likewise, communication module 40 may refrain from adding the A messages to Alice's "sent items" folder.

FIGS. 2A, 2B, 3A, and 3B are described above in the context of secure communication via email. Accordingly, as indicated above, the communications between local DPS 20 and remote DPS 80 may traverse N different email servers for Alice and N different email servers for Bank Co. Consequently, each of those email servers will be operating as an intermediate node for communication between local DPS 20 and remote DPS 80.

In addition or alternatively, the same or similar operations may be used for secure communications via protocols other than email. For instance, the communication modules in local DPS 20 and remote DPS 80 may serve as Internet browsers, web servers, or the like. Accordingly, Alice may use communication module 40 to log in to a website of Bank Co. and then to receive information and to provide Bank Co. with instructions concerning Alice's checking account. Consequently, instead of using email servers as intermediate nodes, local DPS 20 and remote DPS 80 may use different servers, routers, bridges, and/or other nodes on the Internet as intermediate nodes.

The endpoints may use any suitable techniques to select or define the N routes to be used for sharing seed values. For instance, in one embodiment, each endpoint defines its N routes by randomly or substantially randomly selecting some or all of the intermediate nodes within each of those routes. For instance, an endpoint may use hardware and/or software described by Intel Corporation under the name or trademark Digital Random Number Generator (DRNG) to randomly or substantially randomly select the intermediate nodes from a pool of potential intermediate nodes. According to one embodiment, in order to help the endpoints to determine the location of opponents, the endpoints make sure that each of its routes includes at least one intermediate node that differs from the intermediate nodes in all of the other routes selected by that party.

The random number generator may provide a near perfect distribution of random numbers, such that a probability of collisions is close to $1-(1/N)$, where N is the number space. Therefore, the random number generator may produce a sequence of random numbers in a sequence that produces an original route through a network of nodes that has a low probability of collisions.

Figure 4:
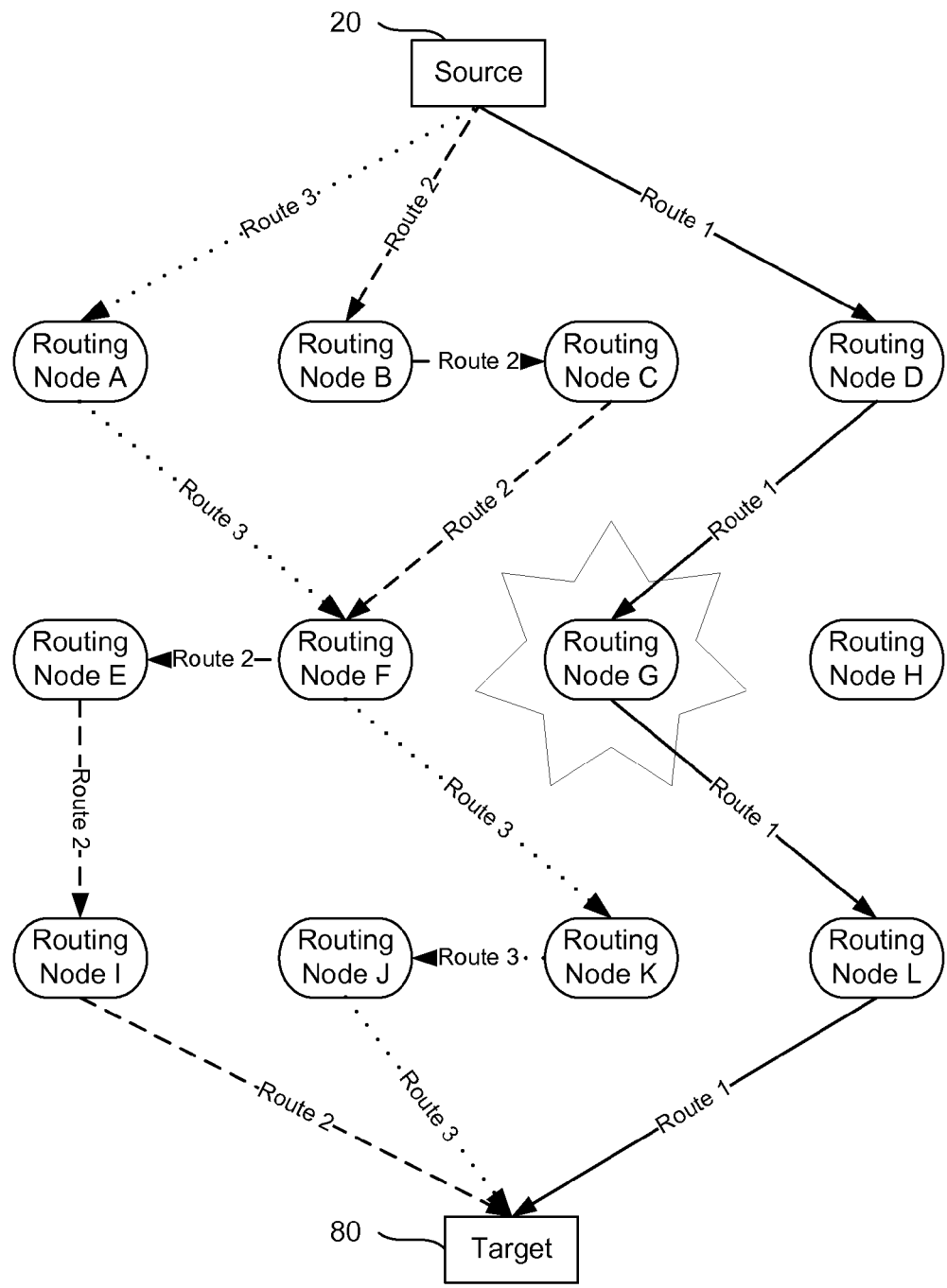
FIG. 4 is a flow diagram illustrating communications within a key exchange system.

FIG. 4 is a flow diagram illustrating communications within key exchange system 10 via different intermediate nodes on the Internet. In particular, FIG. 4 illustrates local DPS or source 20 sending an A message to remote DPS or target 80 via three different routes. The first route ("Route 1") is depicted with solid lines directed, in sequence, to routing node D, routing node G, routing node L, and finally target 80. The second route ("Route 2") is depicted with dashed lines directed, in sequence, to routing node B, routing node C, routing node F, routing node E, routing node I, and finally target 80. The third route ("Route 3") is depicted with dotted lines directed, in sequence, to routing node A, routing node F, routing node K, routing node J, and finally target 80. In addition, routing node G is depicted within a star, to indicate that an opponent is using that routing node to mount a MITM attack on communications between source 20 and target 80.

Also, any suitable techniques may be used to identify the source and the target. For instance, the source may use a URL or an IP address to identify the website for Bank Co. as the target. Similarly, the target may use an IP address for the source to identify the source as the intended recipient of messages from the target.

The endpoints may also specify some or all of the intermediate nodes to be used for some or all of the N routes. For instance, the endpoints may establish the different routes by directing different copies of the message through different proxy servers. In addition or alternatively, the endpoints may use Multipath Transmission Control Protocol (MPTCP) to establish different routes. For instance, one route may use nodes on a third generation (3G) mobile telecommunications technology, and a different route may use nodes on a WiFi network.

In addition or alternatively, the endpoints may use an onion routing network to send messages over different routes. The onion network may include one or more directory nodes that provide each the endpoints with a list of potential routes. More information about onion routing may be found at en.wikipedia.org/wiki/Onion_routing. In one embodiment, each node in the network serves as a directory node.

In one embodiment, the endpoints include Tor software, and the endpoints use the Tor network as the onion network. The Tor software may enable the endpoints to automatically route Internet communications through multiple different routes in the Tor routing network. In one embodiment, one or more directory nodes use a random number generator to design different routes between the endpoints, and the directory node(s) may provide those routes o the endpoints as a list of optional routes. Each endpoint may then randomly select N of the optional routes provided by the directory node(s). And then for each selected route, the endpoint may perform the nested encryption necessary to enable the route. For instance, as explained at en.wikipedia.org/wiki/Tor_(anonymity_network), the Tor software may encrypt the original data (including the destination IP address) multiple times and send the encrypted data through a virtual circuit comprising successive, randomly selected Tor nodes or relays. Thus, in addition to providing for random routes, Tor may provide for anonymization of the source and the target. For instance, the Tor network may obfuscate the Internet Protocol (IP) address of the source from the target. The target may only be able to determine the IP address if the last routing node that delivered a packet to the target.

However, in one embodiment, the endpoints may include the route data in some or all of the messages, so that the recipient of a rogue message (e.g., a message with a non-prevalent B value) can blacklist the route or node(s) used by the rogue message.

In another embodiment, the endpoints may use an external service that randomly selects N different routes. For example, the endpoints may trust the intermediate nodes in a Tor routing network to select N random, non-overlapping, non-repeating routes. One or more intermediate nodes in the Tor network may randomly generate the N routes dynamically. For instance, the endpoints or an intermediate node may set a maximum hop count, and each intermediate node may increment a current hop count whenever it processes a message. The message may also reveal the destination IP address to each intermediate node. When the current hop count matches the maximum hop count, the intermediate node at that point may then deliver the message to the intended target.

If an attacker somehow intercepts a message by compromising an intermediate node on the Tor route, the intermediate node may be used to attempt a MITM attack. If the target does not require the nodes to have a TEE, the attacker may need to compromise a majority of TOR nodes in order to defeat the ability of the target to distinguish between attack nodes and safe nodes, since the N messages traverse multiple different random routes through the network, and the M-of-N threshold policy requires at least a predetermined percentage of those messages to match.

Furthermore, if the target requires the nodes to have a TEE, the attacker cannot easily circumvent the TEE to succeed with the MITM attack. Instead, the attacker may merely redirect a message to a different node, which only increases hop count leading toward eventual redirection to the destination node.

Moreover, the endpoints may be configured to account for TEE attributes in a more flexible manner when determining whether a message should be accepted as good. For instance, routing nodes could consist of TEEs that can perform an attestation and thereby assert a stronger weight of believability regarding an assertion of correct operation. In other words, the recipient may assign a greater weight to TEE nodes, compared to non-TEE nodes. And the recipient may use a threshold policy that accepts a message as good even though the number of matching messages is less than half of N, as long as those matching messages came from nodes with a TEE. In other words, the recipient can apply a threshold policy that favors TEE nodes, such that even fewer than 50% nodes could still be regarded as the uncompromised seed value. Accordingly, if some nodes on the network use a TEE and others don't, even if a threshold of non-TEE nodes are attacked successfully, the endpoints may be able to successfully complete the DH key exchange process.

Furthermore, endpoints may use platform security technologies like those described above with regard to SGX and signature protocols like those described above with regard to EPID without destroying the random and anonymous properties of an onion routing network when the attested values are shared with the destination.

As has been described, each endpoint may exchange N instances of its seed with the other endpoint, and each endpoint may compare the number of successful routes with the number of unsuccessful routes. Each endpoint may also compare its result with a policy that provides a threshold value reflecting the maximum acceptable amount of risk. In one embodiment, the endpoints do not use digital signatures or any other previously established proof of identity or authenticity to vouch for the seed values.

After successful completing a seed exchange, the endpoints may use the resulting shared secret (possibly via one or more additional keys that may be derived from the shared secret) to protect many different kinds of communications or information, including without limitation email, text, voice, video, and machine-to-machine communications. One of the many different potential applications for the techniques described herein is for secure communications among devices that interact with each other as nodes within the Internet of things (IoT).

In one embodiment, a communication module according to the present disclosure may be implemented as a program (or as a collection of programs) that runs as a user level application on top of an OS. Alternatively, a communication module according to the present disclosure may be implemented as part of the OS, as firmware, or as any other suitable type of software.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. The present teachings may also be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system to support the exchange of digital keys. The data processing system comprises at least one processor and instructions which, when executed by the processor, enable the data processing system to perform various operations. Those operations comprise (a) during a Diffie-Hellman (DH) key exchange process with a second data processing system, receiving multiple copies of a seed message from the second data processing system via multiple different network routes, wherein each copy of the seed message includes a seed value; (b) determining a prevalent seed value, based on the multiple copies of the seed message; (c) computing a prevalence metric for the prevalent seed value; and (d) determining whether a seed exchange portion of the DH key exchange process should be considered successful, based at least in part on the prevalence metric.

Example A2 includes the features of Example A1, and the prevalence metric reflects how many of the seed messages contained the prevalent seed value. Additionally, the operation of determining whether the seed exchange portion of the DH key exchange process should be considered successful is also based a predetermined minimum acceptable level of prevalence.

Example A3 includes the features of Example A2, and the predetermined minimum acceptable level of prevalence is greater than fifty percent.

Example A4 includes the features of Example A2, and the predetermined minimum acceptable level of prevalence is one hundred percent.

Example A5 includes the features of Example A1, and the operations further comprise communicating with the second data processing system to establish the predetermined minimum acceptable level of prevalence. Example A5 may also include the features of any one or more of Examples A3 through A4.

Example A6 includes the features of Example A1, and the operations further comprise, in response to determining that the seed exchange portion of the DH key exchange process should be considered successful, using the prevalent seed value to generate a shared secret. Example A6 may also include the features of any one or more of Examples A2 through A5.

Example A7 includes the features of Example A1, and the seed value from the second data processing system comprises a first seed value. Additionally, the operations further comprise (a) generating a second seed value, and (b) sending multiple copies of the second seed value to the second data processing system via multiple different network routes. Example A7 may also include the features of any one or more of Examples A2 through A6.

Example A8 includes the features of Example A7, and the operations further comprise (a) using a first intermediate node to send a first copy of the second seed value to the second data processing system; and (b) using a different second intermediate node to send a second copy of the second seed value to the second data processing system. Also, the first and second intermediate nodes are selected substantially randomly. Example A8 may also include the features of any one or more of Examples A2 through A7.

Example A9 includes the features of Example A1, and the operations further comprise determining that the DH key exchange process should be considered successful only if the second data processing system provides, during the DH key exchange process, attestation information attesting to a trusted execution environment on the second data processing system. Example A9 may also include the features of any one or more of Examples A2 through A8.

Example A10 includes the features of Example A9, and the operation of determining that the DH key exchange process should be considered successful comprises determining that the DH key exchange process should be considered successful only if the attestation information from the second data processing system is verified with a signature based on a private key from a trusted entity. Example A10 may also include the features of any one or more of Examples A2 through A8.

Example A11 includes the features of Example A1, and the operation of determining that the DH key exchange process should be considered successful comprises determining that the DH key exchange process should be considered successful only if the attestation information from the second data processing system comprises an Enhanced Privacy ID (EPID) signature. Example A11 may also include the features of any one or more of Examples A2 through A10.

Example A12 includes the features of Example A1, and the operations further comprise (a) automatically determining that a first network route among the multiple different network routes involves an intermediate nodes with a trusted execution environment and that a second network route among the multiple different network routes does not involve any intermediate nodes with trusted execution environments; and (b) in response to determining that the first network route involves the trusted execution environment and the second network route does not involve any trusted execution environments, assigning greater weight to the first network route, relative to the second network route, for purposes of determining the prevalent seed value. Example A12 may also include the features of any one or more of Examples A2 through A11.

Example A13 includes the features of Example A1, and the operations further comprise automatically determining that a particular network route among the multiple different network routes involves an intermediate node with a trusted execution environment. Also, the operation of determining whether the seed exchange portion of the DH key exchange process should be considered successful is based at least in part on the determination that the particular network route involves the trusted execution environment. Example A13 may also include the features of any one or more of Examples A2 through A12.

Example B1 is a method to support the exchange of digital keys. The method comprises (a) at a first data processing system, during a Diffie-Hellman (DH) key exchange process, receiving multiple copies of a seed message from a second data processing system via multiple different network routes, wherein each copy of the seed message includes a seed value; (b) determining a prevalent seed value, based on the multiple copies of the seed message; (c) computing a prevalence metric for the prevalent seed value; and (d) determining whether a seed exchange portion of the DH key exchange process should be considered successful, based at least in part on the prevalence metric.

Example B2 includes the features of Example B1, and the prevalence metric reflects how many of the seed messages contained the prevalent seed value. Also, the operation of determining whether the seed exchange portion of the DH key exchange process should be considered successful is also based a predetermined minimum acceptable level of prevalence.

Example B3 includes the features of Example B2, and the predetermined minimum acceptable level of prevalence is greater than fifty percent.

Example B4 includes the features of Example B2, and the predetermined minimum acceptable level of prevalence is one hundred percent.

Example B5 includes the features of Example B2, and the operations further comprise communicating with the second data processing system to establish the predetermined minimum acceptable level of prevalence. Example B5 may also include the features of any one or more of Examples B3 through B4.

Example B6 includes the features of Example B1, and the operations further comprise, in response to determining that the seed exchange portion of the DH key exchange process should be considered successful, using the prevalent seed value to generate a shared secret. Example B6 may also include the features of any one or more of Examples B2 through B5.

Example B7 includes the features of Example B1, and the seed value from the second data processing system comprises a first seed value. Also, the operations further comprise (a) generating a second seed value at the first data processing system; and (b) sending multiple copies of the second seed value from the first data processing system to the second data processing system via multiple different network routes. Example B7 may also include the features of any one or more of Examples B2 through B6.

Example B8 includes the features of Example B7, and the operations further comprise (a) using a first intermediate node to send a first copy of the second seed value to the second data processing system; and (b) using a different second intermediate node to send a second copy of the second seed value to the second data processing system. Also, the first and second intermediate nodes are selected substantially randomly. Example B8 may also include the features of any one or more of Examples B2 through B6.

Example B9 includes the features of Example B1, and the operations further comprise determining that the DH key exchange process should be considered successful only if the second data processing system provides, during the DH key exchange process, attestation information attesting to a trusted execution environment on the second data processing system. Example B9 may also include the features of any one or more of Examples B2 through B8.

Example B10 includes the features of Example B9, and the operation of determining that the DH key exchange process should be considered successful comprises determining that the DH key exchange process should be considered successful only if the attestation information from the second data processing system is verified with a signature based on a private key from a trusted entity. Example B10 may also include the features of any one or more of Examples B2 through B8.

Example B11 includes the features of Example B9, and the operation of determining that the DH key exchange process should be considered successful comprises determining that the DH key exchange process should be considered successful only if the attestation information from the second data processing system comprises an Enhanced Privacy ID (EPID) signature. Example B 11 may also include the features of any one or more of Examples B2 through B8 and B10.

Example B12 includes the features of Example B1, and the operations further comprise (a) automatically determining that a first network route among the multiple different network routes involves an intermediate nodes with a trusted execution environment and that a second network route among the multiple different network routes does not involve any intermediate nodes with trusted execution environments; and (b) in response to determining that the first network route involves the trusted execution environment and the second network route does not involve any trusted execution environments, assigning greater weight to the first network route, relative to the second network route, for purposes of determining the prevalent seed value. Example B12 may also include the features of any one or more of Examples B2 through B11.

Example B13 includes the features of Example B1, and the operations further comprise automatically determining that a particular network route among the multiple different network routes involves an intermediate node with a trusted execution environment. Also, the operation of determining whether the seed exchange portion of the DH key exchange process should be considered successful is based at least in part on the determination that the particular network route involves the trusted execution environment. Example B13 may also include the features of any one or more of Examples B2 through B12.

Example C is at least one machine accessible medium comprising computer instructions to support exchange of digital keys. The computer instructions, in response to being executed on a data processing system, enable the data processing system to perform a method according to any of Examples B1 through B13.

Example D is a data processing system with support for exchange of digital keys. The data processing system comprising a processing element, at least one machine accessible medium responsive to the processing element, and computer instructions stored at least partially in the at least one machine accessible medium. The computer instructions, in response to being executed, enable the data processing system to perform a method according to any of Examples B1 through B13.

Example E is a data processing system with support for exchange of digital keys. The data processing system comprises means for performing the method of any one of Examples B1 through B13.

Example F1 is an apparatus to support the exchange of digital keys. The apparatus comprises at least one machine accessible medium and instructions in the at least one machine accessible medium. When executed by a first data processing system, the instructions enable the first data processing system to perform operations comprising: (a) during a Diffie-Hellman (DH) key exchange process with a second data processing system, receiving multiple copies of a seed message from the second data processing system via multiple different network routes, wherein each copy of the seed message includes a seed value; (b) determining a prevalent seed value, based on the multiple copies of the seed message; (c) computing a prevalence metric for the prevalent seed value; and (d) determining whether a seed exchange portion of the DH key exchange process should be considered successful, based at least in part on the prevalence metric.

Example F2 includes the features of Example F1, and the prevalence metric reflects how many of the seed messages contained the prevalent seed value. Also, the operation of determining whether the seed exchange portion of the DH key exchange process should be considered successful is also based a predetermined minimum acceptable level of prevalence.

Example F3 includes the features of Example F2, and the predetermined minimum acceptable level of prevalence is greater than fifty percent.

Example F4 includes the features of Example F2, and the predetermined minimum acceptable level of prevalence is one hundred percent.

Example F5 includes the features of Example F2, and the operations further comprise communicating with the second data processing system to establish the predetermined minimum acceptable level of prevalence. Example F5 may also include the features of any one or more of Examples F3 through F4.

Example F6 includes the features of Example F1, and the operations further comprise, in response to determining that the seed exchange portion of the DH key exchange process should be considered successful, using the prevalent seed value to generate a shared secret. Example F6 may also include the features of any one or more of Examples F2 through F5.

Example F7 includes the features of Example F1, and the seed value from the second data processing system comprises a first seed value. Also, the operations further comprise (a) generating a second seed value; and (b) sending multiple copies of the second seed value to the second data processing system via multiple different network routes. Example F7 may also include the features of any one or more of Examples F2 through F6.

Example F8 includes the features of Example F7, and the operations further comprise (a) using a first intermediate node to send a first copy of the second seed value to the second data processing system; and (b) using a different second intermediate node to send a second copy of the second seed value to the second data processing system. Also, the first and second intermediate nodes are selected substantially randomly. Example F8 may also include the features of any one or more of Examples F2 through F6.

Example F9 includes the features of Example F1, and the operations further comprise determining that the DH key exchange process should be considered successful only if the second data processing system provides, during the DH key exchange process, attestation information attesting to a trusted execution environment on the second data processing system. Example F9 may also include the features of any one or more of Examples F2 through F8.

Example F10 includes the features of Example F9, and the operation of determining that the DH key exchange process should be considered successful comprises determining that the DH key exchange process should be considered successful only if the attestation information from the second data processing system is verified with a signature based on a private key from a trusted entity. Example F10 may also include the features of any one or more of Examples F2 through F8.

Example F11 includes the features of Example F9, and the operation of determining that the DH key exchange process should be considered successful comprises determining that the DH key exchange process should be considered successful only if the attestation information from the second data processing system comprises an Enhanced Privacy ID (EPID) signature. Example F11 may also include the features of any one or more of Examples F2 through F8 and F10.

Example F12 includes the features of Example F1, and the operations further comprise (a) automatically determining that a first network route among the multiple different network routes involves an intermediate nodes with a trusted execution environment and that a second network route among the multiple different network routes does not involve any intermediate nodes with trusted execution environments; and (b) in response to determining that the first network route involves the trusted execution environment and the second network route does not involve any trusted execution environments, assigning greater weight to the first network route, relative to the second network route, for purposes of determining the prevalent seed value. Example F12 may also include the features of any one or more of Examples F2 through F11.

Example F13 includes the features of Example F1, and the operations further comprise automatically determining that a particular network route among the multiple different network routes involves an intermediate node with a trusted execution environment. Also, the operation of determining whether the seed exchange portion of the DH key exchange process should be considered successful is based at least in part on the determination that the particular network route involves the trusted execution environment. Example F13 may also include the features of any one or more of Examples F2 through F12.

Example G1 is a data processing system to support exchange of digital keys. The data processing system comprises a communication module which, when executed by the data processing system, is operable to receive multiple copies of a seed message from a second data processing system via multiple different network routes, as part of a Diffie-Hellman (DH) key exchange process with the second data processing system, wherein each copy of the seed message includes a seed value. The data processing system also comprises a security module which, when executed by the data processing system, is operable to perform operations comprising (a) determining a prevalent seed value, based on the multiple copies of the seed message; and (b) computing a prevalence metric for the prevalent seed value. The data processing system also comprises a man-in-the-middle (MITM) detector which, when executed by the data processing system, is operable to determine whether a seed exchange portion of the DH key exchange process should be considered successful, based at least in part on the prevalence metric.

Example G2 includes the features of Example G1, and the prevalence metric reflects how many of the seed messages contained the prevalent seed value. Also, the operation of determining whether the seed exchange portion of the DH key exchange process should be considered successful is also based a predetermined minimum acceptable level of prevalence.

Example G3 includes the features of Example G1, and the communication module is also operable to communicate with the second data processing system to establish the predetermined minimum acceptable level of prevalence. Example G3 may also include the features of Example G2.

Example G4 includes the features of Example G1, and the security module is operable to use the prevalent seed value to generate a shared secret, in response to the MITM detector determining that the seed exchange portion of the DH key exchange process should be considered successful. Example G4 may also include the features of any one or more of Examples G2 through G3.

Example G5 includes the features of Example G1, and the seed value from the second data processing system comprises a first seed value. Also, the communication module is operable to perform further operations comprising (a) generating a second seed value; and (b) sending multiple copies of the second seed value to the second data processing system via multiple different network routes. Example G5 may also include the features of any one or more of Examples G2 through G4.

Example G6 includes the features of Example G5, and the communication module is operable to perform operations comprising (a) using a first intermediate node to send a first copy of the second seed value to the second data processing system; and (b) using a different second intermediate node to send a second copy of the second seed value to the second data processing system. Also, the communication module comprises a route selector that is operable to select the first and second intermediate nodes substantially randomly. Example G6 may also include the features of any one or more of Examples G2 through G4.

What is claimed is:

1. A data processing system to support the exchange of digital keys, the data processing system comprising:
    at least one hardware processor; and
    instructions which, when executed by the processor, enable the data processing system to perform operations comprising:
        during a Diffie-Hellman (DH) key exchange process with a second data processing system, receiving multiple copies of a seed message from the second data processing system via multiple different network routes, wherein each copy of the seed message includes a seed value;
        determining a prevalent seed value, based on the multiple copies of the seed message;
        computing a prevalence metric for the prevalent seed value; and
        determining whether a seed exchange portion of the DH key exchange process has been successfully performed, based at least in part on the prevalence metric.

2. A data processing system according to claim 1, wherein:
    the prevalence metric reflects how many of the seed messages contained the prevalent seed value; and
    the operation of determining whether the seed exchange portion of the DH key exchange process has been successfully performed is also based a predetermined minimum acceptable level of prevalence.

3. A data processing system according to claim 1, wherein the operations further comprise:
    determining that the DH key exchange process has been successfully performed only if the second data processing system provides, during the DH key exchange process, attestation information attesting to a trusted execution environment on the second data processing system.

4. A data processing system according to claim 1, wherein the operations further comprise:
    automatically determining that a particular network route among the multiple different network routes involves an intermediate node with a trusted execution environment; and
    wherein the operation of determining whether the seed exchange portion of the DH key exchange process has been successfully performed is based at least in part on the determination that the particular network route involves the trusted execution environment.

5. A method to support the exchange of digital keys, the method comprising:
    at a first hardware data processing system, during a Diffie-Hellman (DH) key exchange process, receiving multiple copies of a seed message from a second data processing system via multiple different network routes, wherein each copy of the seed message includes a seed value;
    determining, by the first hardware data processing system, a prevalent seed value, based on the multiple copies of the seed message;
    computing, by the first hardware data processing system, a prevalence metric for the prevalent seed value; and
    determining, by the first hardware data processing system, whether a seed exchange portion of the DH key exchange process has been successfully performed, based at least in part on the prevalence metric.

6. A method according to claim 5, wherein:
    the prevalence metric reflects how many of the seed messages contained the prevalent seed value; and
    the operation of determining whether the seed exchange portion of the DH key exchange process has been successfully performed is also based a predetermined minimum acceptable level of prevalence.

7. At least one tangible, non-transitory machine accessible medium comprising instructions stored thereon which, when executed by a first data processing system, enable the first data processing system to perform operations comprising:
    during a Diffie-Hellman (DH) key exchange process with a second data processing system, receiving multiple copies of a seed message from the second data processing system via multiple different network routes, wherein each copy of the seed message includes a seed value;
    determining a prevalent seed value, based on the multiple copies of the seed message;
    computing a prevalence metric for the prevalent seed value; and
    determining whether a seed exchange portion of the DH key exchange process has been successfully performed, based at least in part on the prevalence metric.

8. At least one tangible, non-transitory machine accessible medium according to claim 7, wherein:
    the prevalence metric reflects how many of the seed messages contained the prevalent seed value; and
    the operation of determining whether the seed exchange portion of the DH key exchange process has been successfully performed is also based a predetermined minimum acceptable level of prevalence.

9. At least one tangible, non-transitory machine accessible medium according to claim 8, wherein the predetermined minimum acceptable level of prevalence is greater than fifty percent.

10. At least one tangible, non-transitory machine accessible medium according to claim 8, wherein the predetermined minimum acceptable level of prevalence is one hundred percent.

11. At least one tangible, non-transitory machine accessible medium according to claim 8, wherein the operations further comprise:
communicating with the second data processing system to establish the predetermined minimum acceptable level of prevalence.

12. At least one tangible, non-transitory machine accessible medium according to claim 7, wherein the operations further comprise:
in response to determining that the seed exchange portion of the DH key exchange process has been successfully performed, using the prevalent seed value to generate a shared secret.

13. At least one tangible, non-transitory machine accessible medium according to claim 7, wherein:
the seed value from the second data processing system comprises a first seed value; and
the operations further comprise:
generating a second seed value; and
sending multiple copies of the second seed value to the second data processing system via multiple different network routes.

14. At least one tangible, non-transitory machine accessible medium according to claim 13, wherein the operations further comprise:
using a first intermediate node to send a first copy of the second seed value to the second data processing system; and
using a different second intermediate node to send a second copy of the second seed value to the second data processing system;
wherein the first and second intermediate nodes are selected substantially randomly.

15. At least one tangible, non-transitory machine accessible medium according to claim 7, wherein the operations further comprise:
determining that the DH key exchange process has been successfully performed only if the second data processing system provides, during the DH key exchange process, attestation information attesting to a trusted execution environment on the second data processing system.

16. At least one tangible, non-transitory machine accessible medium according to claim 15, wherein the operation of determining that the DH key exchange process has been successfully performed comprises:
determining that the DH key exchange process has been successfully performed only if the attestation information from the second data processing system is verified with a signature based on a private key from a trusted entity.

17. At least one tangible, non-transitory machine accessible medium according to claim 15, wherein the operation of determining that the DH key exchange process has been successfully performed comprises:
determining that the DH key exchange process has been successfully performed only if the attestation information from the second data processing system comprises an Enhanced Privacy ID (EPID) signature.

18. At least one tangible, non-transitory machine accessible medium according to claim 7, wherein the operations further comprise:
automatically determining that a first network route among the multiple different network routes involves an intermediate nodes with a trusted execution environment and that a second network route among the multiple different network routes does not involve any intermediate nodes with trusted execution environments; and
in response to determining that the first network route involves the trusted execution environment and the second network route does not involve any trusted execution environments, assigning greater weight to the first network route, relative to the second network route, for purposes of determining the prevalent seed value.

19. At least one tangible, non-transitory machine accessible medium according to claim 7, wherein the operations further comprise:
automatically determining that a particular network route among the multiple different network routes involves an intermediate node with a trusted execution environment; and
wherein the operation of determining whether the seed exchange portion of the DH key exchange process has been successfully performed is based at least in part on the determination that the particular network route involves the trusted execution environment.

20. A data processing system to support exchange of digital keys, the data processing system comprising:
a hardware processor;
a communication module which, when executed by the hardware processor of the data processing system, is operable to receive multiple copies of a seed message from a second data processing system via multiple different network routes, as part of a Diffie-Hellman (DH) key exchange process with the second data processing system, wherein each copy of the seed message includes a seed value;
a security module which, when executed by the hardware processor of the data processing system, is operable to perform operations comprising:
determining a prevalent seed value, based on the multiple copies of the seed message; and
computing a prevalence metric for the prevalent seed value; and
a man-in-the-middle (MITM) detector which, when executed by the hardware processor of the data processing system, is operable to determine whether a seed exchange portion of the DH key exchange process has been successfully performed, based at least in part on the prevalence metric.

21. A data processing system according to claim 20, wherein:
the prevalence metric reflects how many of the seed messages contained the prevalent seed value; and
the operation of determining whether the seed exchange portion of the DH key exchange process has been successfully performed is also based a predetermined minimum acceptable level of prevalence.

22. A data processing system according to claim 20, wherein the communication module is also operable to communicate with the second data processing system to establish the predetermined minimum acceptable level of prevalence.

23. A data processing system according to claim 20, wherein the security module is operable to use the prevalent seed value to generate a shared secret, in response to the MITM detector determining that the seed exchange portion of the DH key exchange process has been successfully performed.

24. A data processing system according to claim 20, wherein:
- the seed value from the second data processing system comprises a first seed value; and
- the communication module is operable to perform further operations comprising:
  - generating a second seed value; and
  - sending multiple copies of the second seed value to the second data processing system via multiple different network routes.

25. A data processing system according to claim 20, wherein the communication module is operable to perform operations comprising:
- using a first intermediate node to send a first copy of the second seed value to the second data processing system; and
- using a different second intermediate node to send a second copy of the second seed value to the second data processing system; and
- wherein the communication module comprises a route selector that is operable to select the first and second intermediate nodes substantially randomly.

* * * * *